United States Patent
Beukema et al.

(10) Patent No.: US 6,938,138 B2
(45) Date of Patent: Aug. 30, 2005

(54) METHOD AND APPARATUS FOR MANAGING ACCESS TO MEMORY

(75) Inventors: Bruce Leroy Beukema, Hayfield, MN (US); David Craddock, New Platz, NY (US); Ronald Edward Fuhs, Rochester, MN (US); Thomas Anthony Gregg, Highland, NY (US); Gregory Francis Pfister, Austin, TX (US); Renato John Recio, Austin, TX (US); Steven L. Rogers, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 09/758,788

(22) Filed: Jan. 11, 2001

(65) Prior Publication Data

US 2002/0091841 A1 Jul. 11, 2002

(51) Int. Cl.[7] .............................................. G06F 12/14
(52) U.S. Cl. ...................................... 711/163; 711/206
(58) Field of Search .................................. 711/163, 164, 711/206

(56) References Cited

U.S. PATENT DOCUMENTS

| | | | | |
|---|---|---|---|---|
| 5,802,590 A | * | 9/1998 | Draves ........................ | 711/164 |
| 6,163,834 A | * | 12/2000 | Garcia et al. ............... | 711/206 |
| 6,345,347 B1 | * | 2/2002 | Biran .......................... | 711/163 |
| 2002/0062402 A1 | * | 5/2002 | Regnier et al. ............. | 709/313 |

* cited by examiner

*Primary Examiner*—Hiep T. Nguyen
(74) *Attorney, Agent, or Firm*—Duke W. Yee; Mark E. McBurney; Lisa L. B. Yociss

(57) ABSTRACT

A method and apparatus for accessing a memory. Access rights for a memory operation are verified using a first data structure in response to receiving a request to perform the operation, wherein the request includes a virtual address for the operation. Responsive to access rights being verified for the memory operation, the virtual address translated into a real address using a second data structure.

16 Claims, 6 Drawing Sheets

METHOD AND APPARATUS FOR MANAGING ACCESS TO MEMORY

BACKGROUND OF THE INVENTION

1. Technical Field

The present invention relates generally to an improved network data processing system, and in particular to a method and apparatus for managing a network data processing system. Still more particularly, the present invention provides a method and apparatus for managing access to a memory.

2. Description of Related Art

In a system area network (SAN), the hardware provides a message passing mechanism which can be used for Input/Output devices (I/O) and interprocess communications between general computing nodes (IPC). Processes executing on devices access SAN message passing hardware by posting send/receive messages to send/receive work queues on a SAN channel adapter (CA). These processes also are referred to as "consumers". The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

A host channel adapter transfers data received on different communications links directly to system memory. Additionally, the host channel fetches data from system memory for transfer on the communications links. Mechanisms are needed to provide protection against unauthorized access of this memory. In addition, mechanisms are needed to translate the virtual addresses that reference this memory into the real addresses used to access the memory. Therefore, it would be advantageous to have an improved method and apparatus for controlling access to memory.

SUMMARY OF THE INVENTION

The present invention provides a method and apparatus for accessing a memory. Access rights for a memory operation are verified using a first data structure in response to receiving a request to perform the operation, wherein the request includes a virtual address for the operation. Responsive to access rights being verified for the memory operation, the virtual address translated into a real address using a second data structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
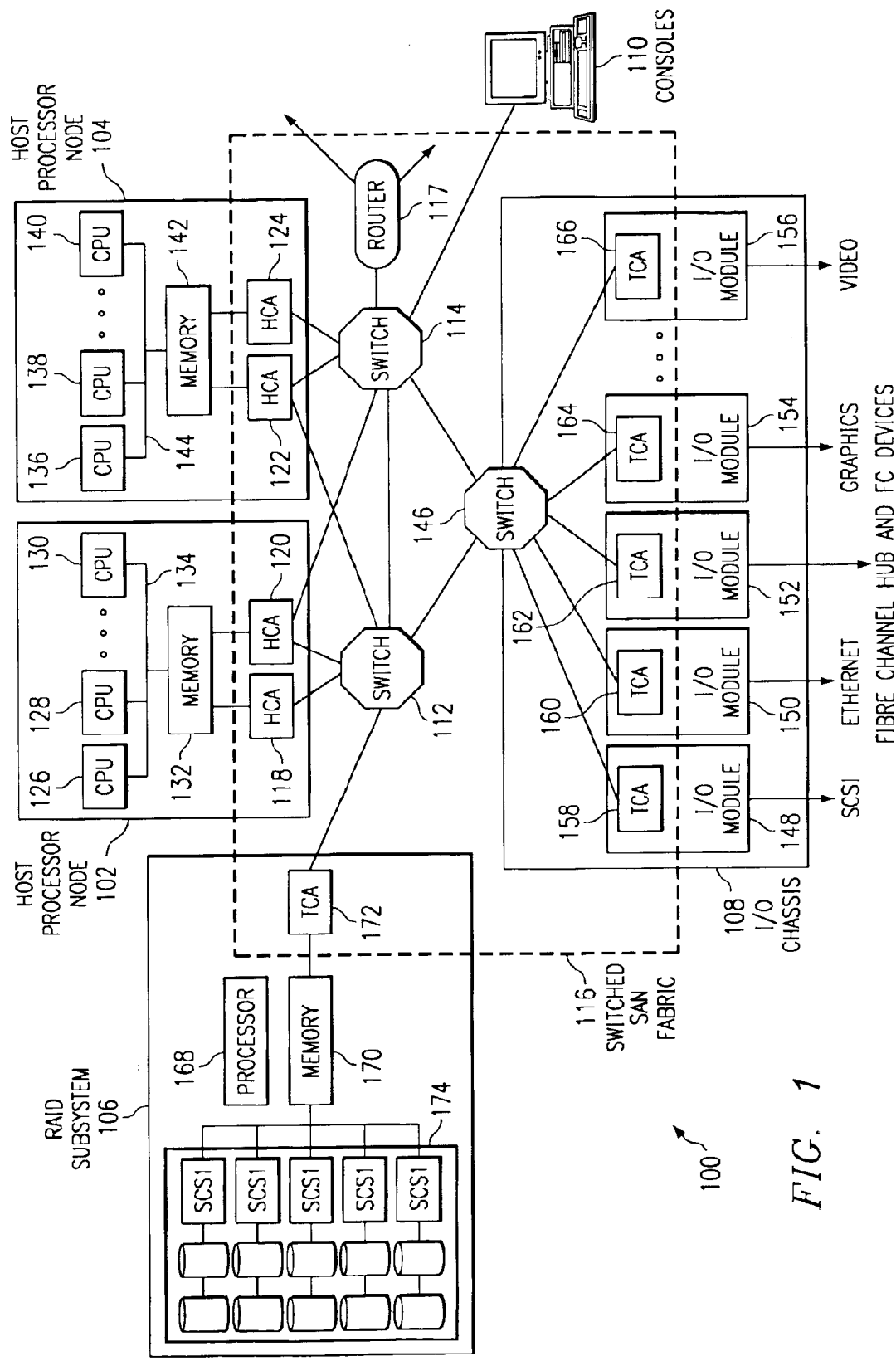
FIG. 1 is a diagram of a network computing system in accordance with a preferred embodiment of the present invention.

With reference now to the figures and in particular with reference to FIG. 1, a diagram of a network global change computing system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched SAN fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Examples of suitable links include, but are not limited to, copper cables, optical cables, and printed circuit copper traces on backplanes and printed circuit boards. For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114. In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166. In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in a distributed computer system. With an I/O adapter attached to the SAN 100, the resulting I/O adapter node has substantially the same communication capability as any host processor node in SAN 100.

Figure 2:
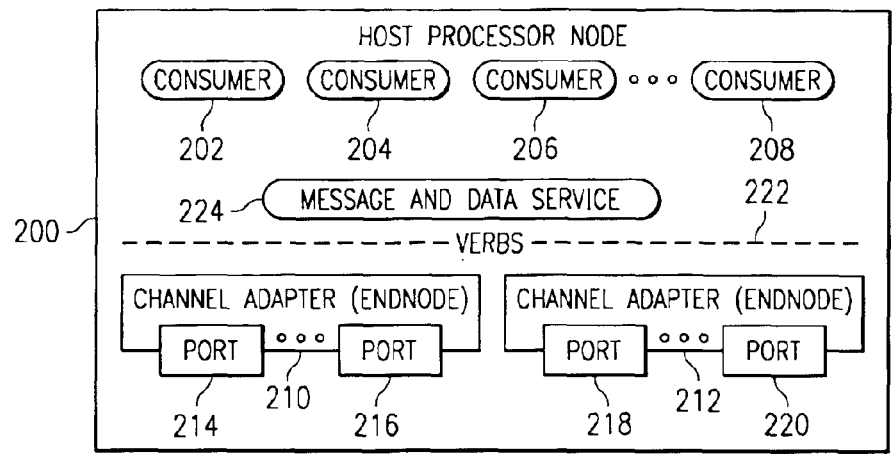
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1.

In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters. Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host.

Additionally, host processor node 200 includes a message and data service 224, which is a higher level interface than the verb layer and is used to process messages and data received through channel adapter 210 and channel adapter 212. Message and data service 224 provides an interface to consumers 202–208 to process messages and other data.

Figure 3:
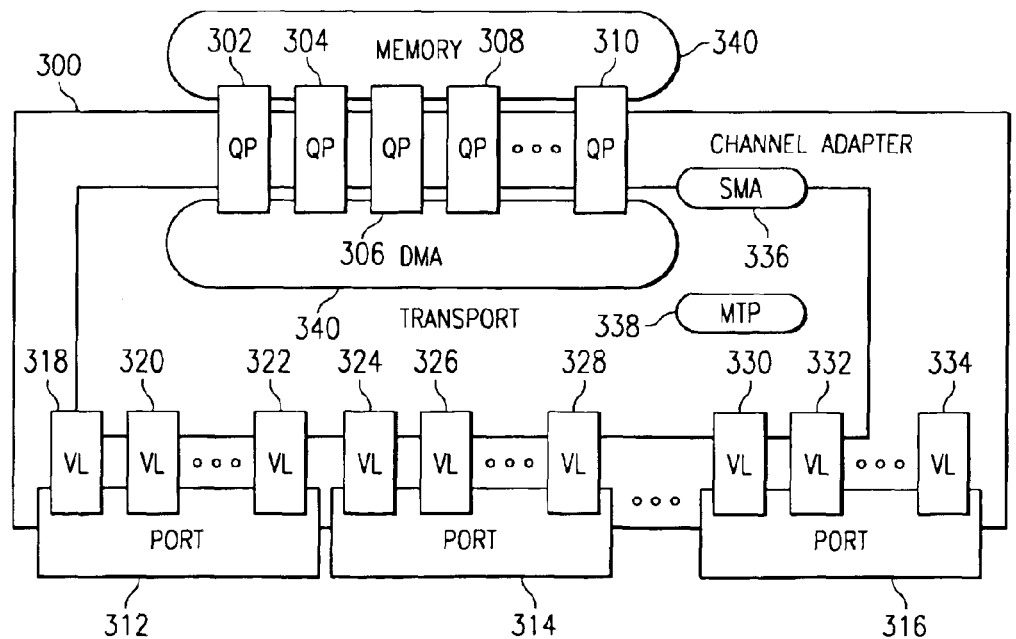
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316.

Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 389 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
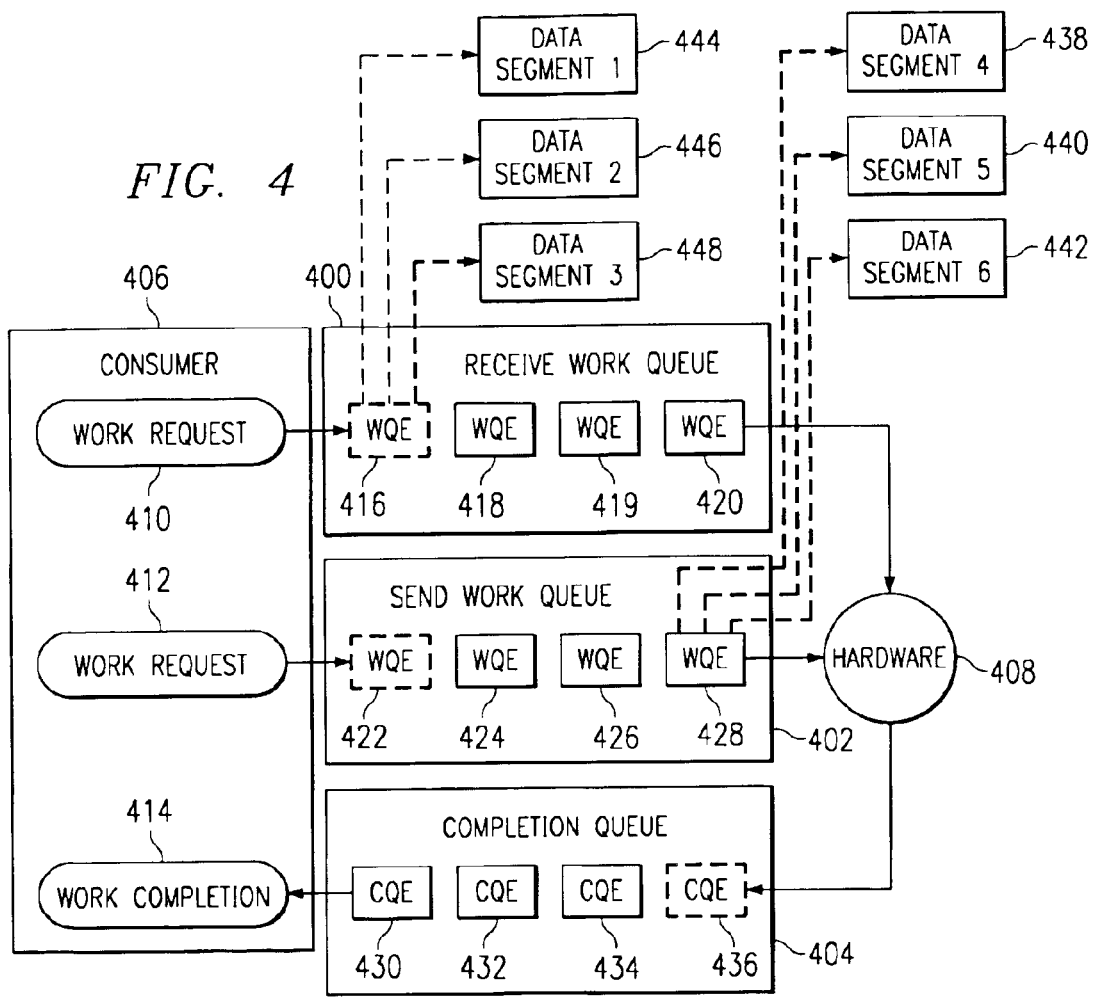
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs). Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues. Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

An RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data ma transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services.

Figure 5:
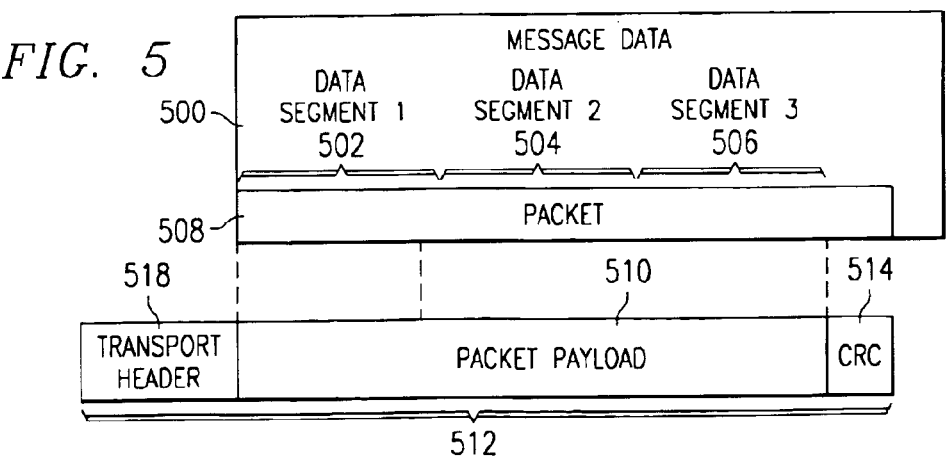
FIG. 5 is an illustration of a data packet in accordance with a preferred embodiment of the present invention.

Turning next to FIG. 5, an illustration of a data packet is depicted in accordance with a preferred embodiment of the present invention. Message data 500 contains data segment 1 502, data segment 2 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing headers 516 and transport 518 are present in data packet 512. Routing header 516 is used to identify source and destination ports for data packet 512. Transport header 518 in this example specifies the destination queue pair for data packet 512. Additionally, transport header 518 also provides information such as the operation code, packet sequence number, and partition for data packet 512. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an endnode may be configured to be members of one or more possibly overlapping sets called partitions.

If a reliable transport service is employed, when a request packet reaches its destination endnode, acknowledgment packets are used by the destination endnode to let the request packet sender know the request packet was validated and accepted at the destination. Acknowledgment packets acknowledge one or more valid and accepted request packets. The destination uses a Negative Acknowledgement (NAK) response packet to inform the requester of an error detected at the destination. One of the errors detected at the destination which results in a NAK is a remote memory protection check.

The requester can have multiple outstanding request packets before it receives any acknowledgments. In one embodiment, the number of multiple outstanding messages is determined when a QP is created.

Figure 6:
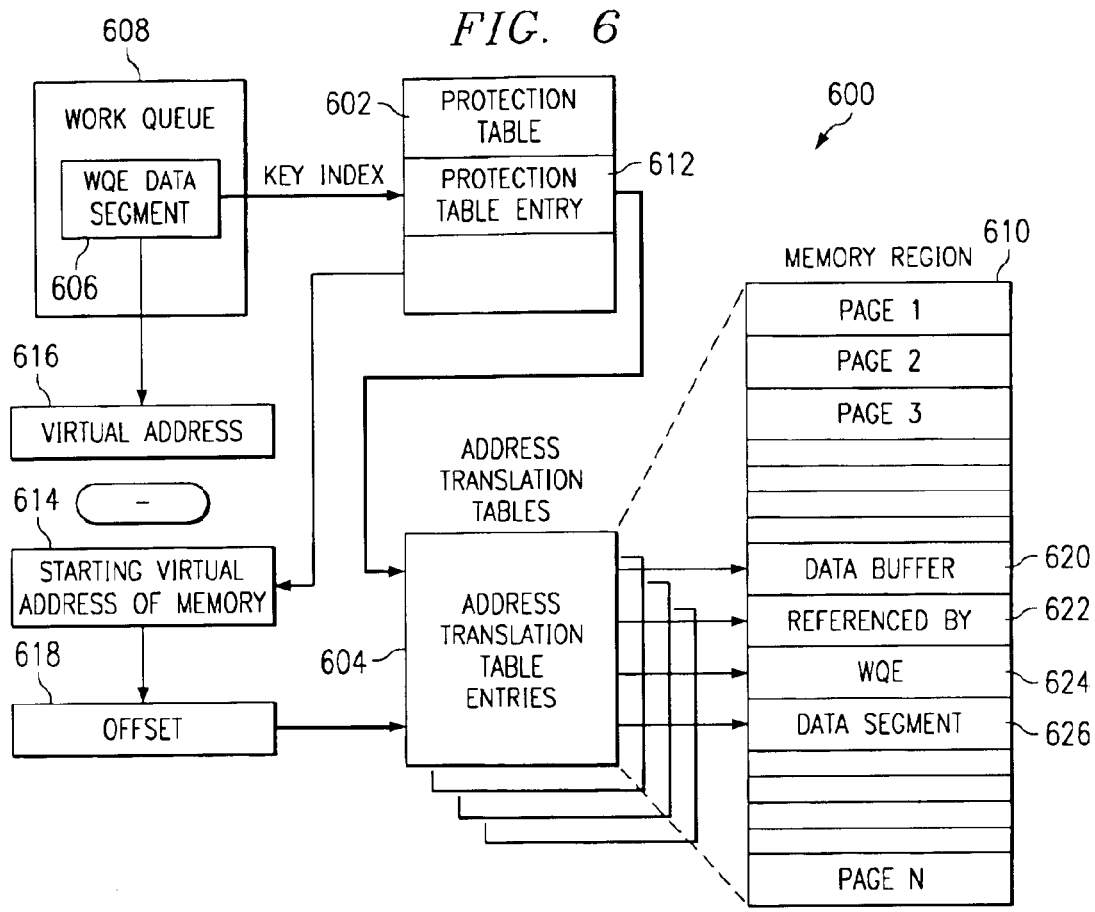
FIG. 6 is a diagram of a memory management system in accordance with a preferred embodiment of the present invention.

Turning next to FIG. 6, a diagram of a memory management system is depicted in accordance with a preferred embodiment of the present invention. Memory management system 600 employs a two-table memory management structure, which includes protection table 602 and address translation tables 604. Protection table 602 contains information used by CA hardware to determine whether access to an area of memory referenced in a work request or a remote operation is authorized. In this example, the access may be requested in WQE data segment 606 within work queue 608. Address translation tables 604 contain the information used to convert a virtual address provided in WQE data segment 606 into a list of one or more real addresses of pages making up a data buffer within a memory, such as memory region 610. In particular, each entry within an address translation table 604 contains a real address of a page. The data buffer may encompass one or more pages in these examples.

When a WQE data segment, such as WQE data segment 606 is received, the key index within the WQE data segment is used as an index into protection table 602 to identify a protection table entry, such as protection table entry 612. This entry is used to determine whether the requested memory access is authorized for the memory region defined by the protection table entry. If access is authorized, then an address translation table within address translation tables 604 is accessed. Multiple address translation tables are present in which one address translation table is used for every memory region defined. Each entry in an address translation table is the real address of a page that makes up part of the memory region. Entries are arranged in ascending order corresponding to the incrementing virtual address associated with the memory region. The CA hardware indexes into the address translation table based on the offset into the memory region, which is calculated by subtracting starting virtual address 614 of the memory region obtained from protection table entry 612 from virtual address 616 specified in the work request or remote operation packet header. This result forms offset 618 into the region of memory to be accessed. The low order bits of this offset are used to index into the page specified in the address translation table entry, and the high order bits are used to index into the address translation table. In this example, offset 618 results in a translation of the address into real addresses identifying pages 620–626 as those containing the data buffer referenced by WQE data segment 606.

Figure 7:
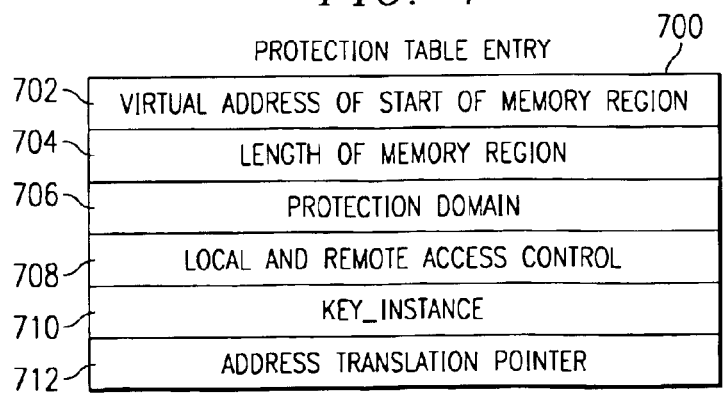
FIG. 7 is a diagram illustrating a protection table entry in accordance with a preferred embodiment of the present invention.

Turning now to FIG. 7, a diagram illustrating a protection table entry is depicted in accordance with a preferred embodiment of the present invention. Protection table entry 700 is an example of a protection table entry, which may be found in protection table 602 in FIG. 6. In this example, protection table entry 700 includes virtual address of start of memory region 702, length of memory region 704, protection domain 706, local and remote access control 708, key_instance 710 and address translation pointer 712.

Each entry in the protection table defines the characteristics of a memory region. A portion of the L_Key or R_Key that is used to reference the data buffer is called the Key_Index, and this is used by the CA hardware to index into the protection table to obtain the protection table entry (PTE) for the memory region that is to be accessed. More specifically, the L_Key Key_Index is used to reference the memory region; and the R_Key Key_Index is used to reference the memory window. The L_Key of the memory region and R_Key of the memory window are included in the Bind WQE. The Key_Index is located in the WQE data segment for local accesses and is located in a remote operation packet for remote accesses.

Virtual address of start of memory region 702 and length of memory region 704 define the bounds of the memory region. Protection domain 706 is used to determine if the QP originating the work queue request has authorization to access this memory region.

Local and remote access control 708 determines the access rights for particular types of operations, such as for example, remote write access is allowed within this memory region. Key_instance 710 is used to validate the portion of the L-Key or R_Key that is not part of the Key_Index, to control access when the definitions of memory regions change. More specifically, the L_Key Key_Instance is validated with the Key_Instance stored in the protection table entry for the region; and the R_Key Key_Instance is validated with the Key_Instance stored in the protection table entry for the window. Address translation pointer 712 references the address translation table associated with this memory region.

Figure 8:
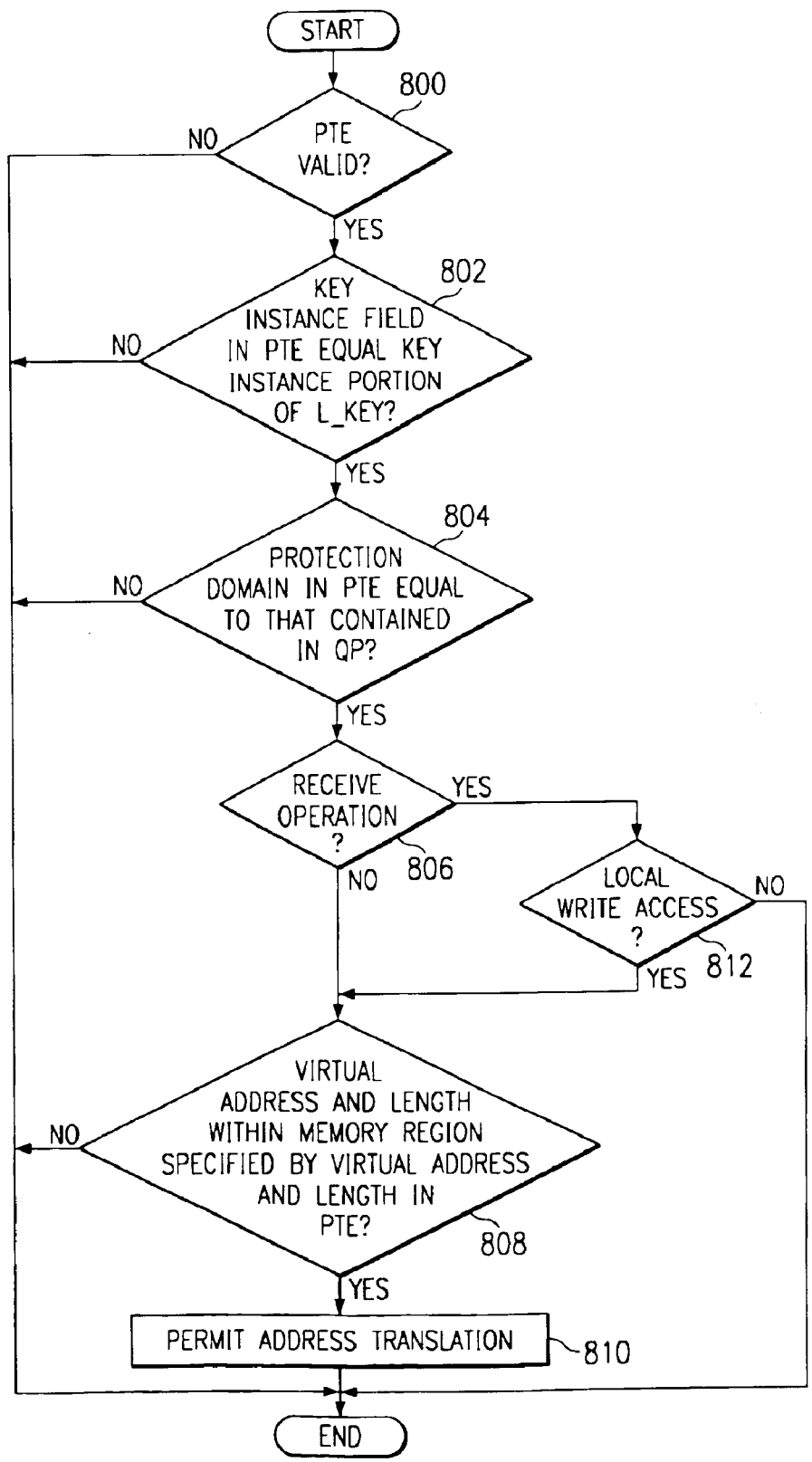
FIG. 8 is a flowchart of a process used for processing a local memory access in accordance with a preferred embodiment of the present invention.

Turning next to FIG. 8, a flowchart of a process used for processing a local memory access is depicted in accordance with a preferred embodiment of the present invention. This process is implemented for handling a local access to memory.

A local access occurs when a work request that is on a send or receive queue on the local node is processed. The data segment of the WQE that is being processed contains the Virtual address, length and L_Key that define the access. A remote access occurs when a remote node initiates a remote operation (RDMA or atomic operation) by sending a packet to the local node. This packet specifies the operation type and also the memory on the local node to be accessed. The memory to be accessed is defined by the virtual address, length and R_Key and in this case they are contained in the packet headers.

When a memory access is specified by a virtual address, length and L_Key that are contained in the data segment field of a WQE, a check is performed. The key_index is used to index into the protection table to obtain the protection table entry (PTE).

The process begins by determining whether the PTE is valid (step 800). If the PTE is valid, then a check is made as to whether the key instance field is equal to the key instance portion of the L_key (step 802) stored in the WQE data segment. If the answer to this determination is yes, then a determination is made as to whether the protection domain in the PTE is equal to that contained in this queue pair (QP) (step 804). The protection domain is an indicator of the identity of the entity that owns the memory region being addressed by an operation. Its use in this check ensures that the QP operating on the memory region is under the control of the same entity that owns the memory region. The exact format of a protection domain may vary from use to use, since it can represent different types of entities created and employed by the operating system of the host processor node. For example, it could represent an operating system process, or a set of processes all accessing a common memory segment. The format does not matter, as long as different entities have different bit patterns in their protection domain, so different entities cause a mismatch. If the protection domains are equal, a determination is made as to whether the requested operation is a receive operation (step 806). If the operation is not a receive operation, then a determination is made as to whether the virtual address and length specified for the data segment fall within the bounds of the memory region specified by the virtual address and length contained in the PTE (step 808). If the answer to this determination is yes, then address translation is permitted (step 810) with the process terminating thereafter.

With reference again to step 808, if the virtual address and length specified for the data segment do not fall within the bounds of the memory region specified by the virtual address and length contained in the PTE, the process terminates without permitting address translation. With reference back to step 806, if the operation is a receive operation, a determination is made as to whether the memory region has local write access (step 812). If local write access is permitted, then the process proceeds to step 808. Otherwise, the process terminates without permitting address translation and a local error CQE is placed on the CQ associated with the receive. This local error CQE is returned to the consumer through a (receive) work completion.

Turning back to steps 804, 802, and 800, if any of these determinations are false, the process also terminates without permitting address translation.

Figure 9:
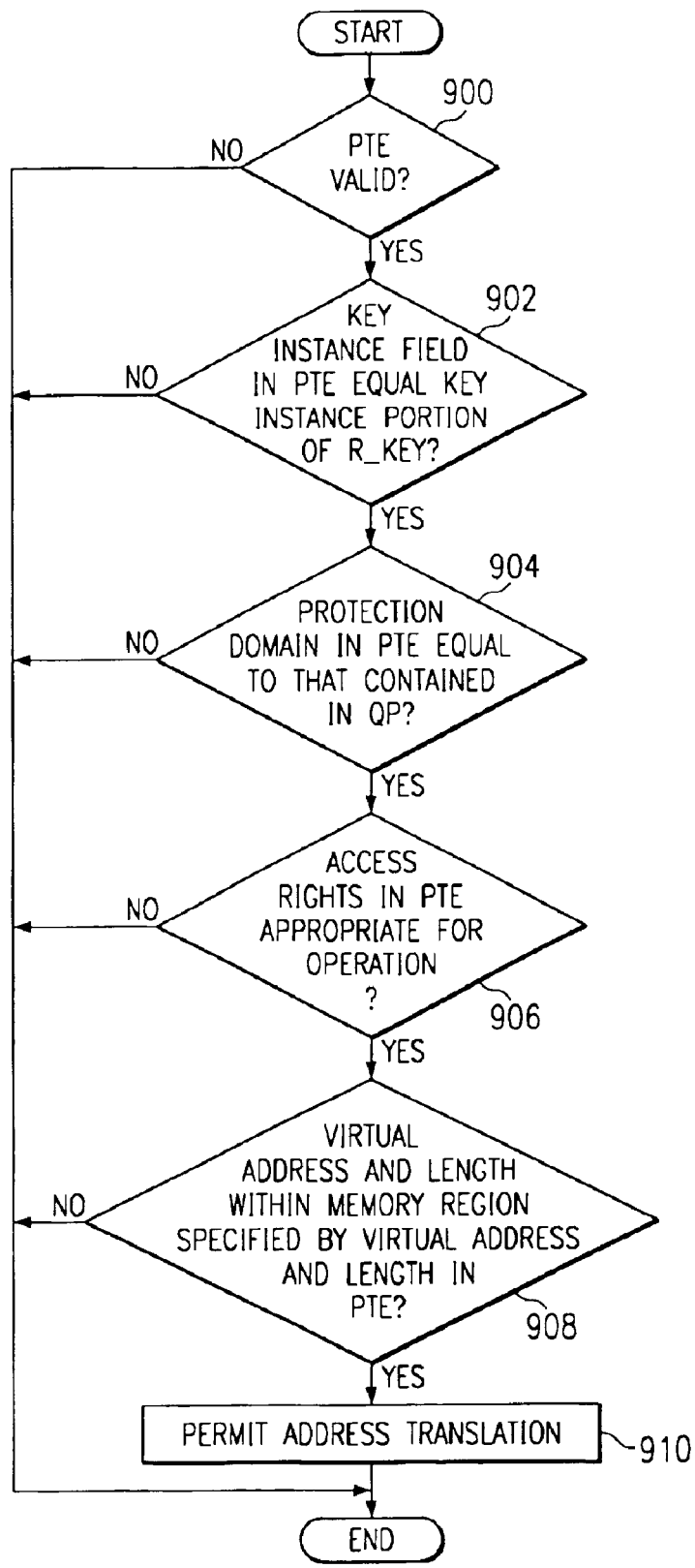
FIG. 9 is a flowchart of a process used for processing a remote memory access in accordance with a preferred embodiment of the present invention.

Turning now to FIG. 9, a flowchart of a process used for processing a remote memory access is depicted in accordance with a preferred embodiment of the present invention. When the memory access is specified by a virtual address, length and R_Key that are contained in an RDMA packet or an atomic operation, and the R_Key references a memory region, a check is performed to determine whether access to the region of memory is permitted.

The Key_Index portion of the R_Key is used to index into the protection table to obtain the PTE. In these examples, checks are performed in the order specified in FIG. 9. If any check fails, the requested memory access is disallowed and a NAK indicating the reason for the error is returned to the sender.

The process begins by determining whether the PTE is valid (step 900). If the PTE is valid, then a check is made as to whether the key instance field is equal to the key instance portion of the R_key contained in the packet(step 902). If the answer to this determination is yes, then a determination is made as to whether the protection domain in the PTE is equal to that contained in this queue pair (QP) (step 904).

If the protection domains are equal, then a determination is made as to whether the access rights defined in the PTE are appropriate for the operation specified in the packet header (step 906). If the access rights are appropriate for this operation, then a determination is made as to whether the virtual address and length specified for the packet fall within the bounds of the memory region specified by the virtual address and length contained in the PTE (step 908). If the answer to this determination is yes, then address translation is permitted (step 910) with the process terminating thereafter.

If an answer of any of the determinations back in step 900–908 are no, then the process terminates without allowing address translation.

In the depicted examples, address translation may be performed by an HCA, which uses the address translation process to determine the real address that is to be used as the source or target for a data move operation when performing local or remote accesses with virtual addresses.

The real address to be accessed by the HCA is determined by first subtracting the virtual address received in the RDMA packet or the data segment specified in the work request from the virtual address specifying the start of the memory region that is contained in the protection table entry to give a memory region offset. The low order bits (12 bits for a 4K page) of the real address are obtained directly from the low order bits of the received virtual address or data segment. The address translation pointer contained in the PTE is used to reference the address translation table for this memory region. The CA hardware indexes into the address translation table based on high order bits of the offset into the memory region to obtain the real address of the page containing the data buffer.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for accessing a memory, the method comprising:
   verifying access rights for a memory operation using a first data structure in response to receiving a request to perform the operation, wherein the request includes a virtual address for the operation;
   responsive to access rights being verified for the memory operation, translating the virtual address into a real address using a second data structure;
   wherein the first data structure includes a virtual address of a start of a memory region within the memory for the operation; and
   wherein the translating step includes subtracting the virtual address of a start of a memory region from the virtual address in the request to form a set of bits to access the second data structure.

2. The method of claim 1, wherein the first data structure is a first table and the second data structure is a second table.

3. The method of claim 2, wherein the first table is a protection table and the second table is an address translation table.

4. The method of claim 1, wherein the first data structure includes a length of the memory region.

5. The method of claim 1, wherein the set of bits includes lower order bits and higher order bits and wherein the higher order bits are used as an index into the second data structure and wherein the lower order bits are used as an index into a page in an entry in the second data structure.

6. A data processing system comprising:
   a bus system;
   a communications unit connected to the bus, wherein data is sent and received using the communications unit;
   a memory connected to the bus system, wherein a set of instructions are located in the memory; and
   a processor unit connected to the bus system, wherein the processor unit executes the set of instructions to verify access rights for a memory operation using a first data structure in response to receiving a request to perform the operation, wherein the request includes a virtual address for the operation;
   translating the virtual address into a real address using a second data structure in response to access rights being verified for the memory operation;
   wherein the first data structure includes a virtual address of a start of a memory region within the memory for the operation; and
   wherein the processor unit executing the set of instructions to translate includes subtracting the virtual address of a start of a memory region from the virtual address in the request to form a set of bits to access the second data structure.

7. The data processing system of claim 6, wherein the bus system includes a primary bus and a secondary bus.

8. The data processing system of claim 6, wherein the processor unit includes a single processor.

9. The data processing system of claim 6, wherein the processor unit includes a plurality of processors.

10. The data processing system claim 6, wherein the communications unit is an Ethernet adapter.

11. A data processing system for accessing a memory, the method comprising:
    verifying means for verifying access rights fur a memory operation using a first data structure in response to receiving a request to perform the operation, wherein the request includes a virtual address for the operation;
    translating means, responsive to access rights being verified for the memory operation, for translating the virtual address into a real address using a second data structure;
    wherein the first data structure includes a virtual address of a start of a memory region within the memory for the operation; and
    wherein the translating means includes subtracting means for subtracting the virtual address of a start of a memory region from the virtual address in the request to form a set of bits to access the second data structure.

12. The data processing system of claim 11, wherein the first data structure is a first table and the second data structure is a second table.

13. The data processing system of claim 12, wherein the first table is a protection table and the second table is an address translation table.

14. The data processing system of claim 11, wherein the first data structure includes a length of the memory region.

15. The data processing system of claim 11, wherein the set of bits includes lower order bits and higher order bits and wherein the higher order bits are used as an index into the second data structure and wherein the lower order bits are used as an index into a page in an entry in the second data structure.

16. A computer program product in a computer-readable medium for accessing a memory in a data processing system, the computer program product comprising:
    first instructions for verifying access rights for a memory operation using a first data structure in response to receiving a request to perform the operation, wherein the request includes a virtual address for the operation;
    second instructions, responsive to access rights being verified for the memory operation, for translating the virtual address into a real address using a second data structure;
    wherein the first data structure includes a virtual address of a start of a memory region within the memory for the operation; and
    wherein in instruction for translating includes instructions for the virtual address of a start of a memory region from the virtual address in the request to form a set of bits to access the second data structure.

* * * * *

UNITED STATES PATENT AND TRADEMARK OFFICE
CERTIFICATE OF CORRECTION

PATENT NO. : 6,938,138 B2
DATED : August 30, 2005
INVENTOR(S) : Beukema et al.

It is certified that error appears in the above-identified patent and that said Letters Patent is hereby corrected as shown below:

Column 12,
Line 16, after "rights" delete "fur" and insert -- for --.
Line 59, after "wherein" delete "in instruction" and insert -- the instructions --.
Line 60, after "for" insert -- subtracting --.

Signed and Sealed this

Sixth Day of June, 2006

JON W. DUDAS
*Director of the United States Patent and Trademark Office*